United States Patent
Shiozaki et al.

(10) Patent No.: US 10,933,494 B2
(45) Date of Patent: Mar. 2, 2021

(54) LAP-FILLET ARC WELDING JOINT AND JOINT STRUCTURE FOR PRESS FORMING PARTS

(71) Applicant: JFE STEEL CORPORATION, Tokyo (JP)

(72) Inventors: Tsuyoshi Shiozaki, Tokyo (JP); Yuichi Tokita, Tokyo (JP); Yoshikiyo Tamai, Tokyo (JP)

(73) Assignee: JFE Steel Corporation, Tokyo (JP)

( * ) Notice: Subject to any disclaimer, the term of this patent is extended or adjusted under 35 U.S.C. 154(b) by 475 days.

(21) Appl. No.: 15/761,554

(22) PCT Filed: Aug. 8, 2016

(86) PCT No.: PCT/JP2016/073230
§ 371 (c)(1),
(2) Date: Mar. 20, 2018

(87) PCT Pub. No.: WO2017/073129
PCT Pub. Date: May 4, 2017

(65) Prior Publication Data
US 2018/0339368 A1   Nov. 29, 2018

(30) Foreign Application Priority Data

Oct. 26, 2015 (JP) .............. JP2015-209711
May 10, 2016 (JP) .............. JP2016-094433

(51) Int. Cl.
*B32B 15/00* (2006.01)
*B23K 33/00* (2006.01)
(Continued)

(52) U.S. Cl.
CPC .............. *B23K 33/004* (2013.01); *B23K 9/02* (2013.01); *B23K 9/025* (2013.01); *B23K 31/00* (2013.01);
(Continued)

(58) Field of Classification Search
None
See application file for complete search history.

(56) References Cited

U.S. PATENT DOCUMENTS

| 6,359,260 B1 | 3/2002 | Peel et al. |
| 10,590,974 B2 * | 3/2020 | Shiozaki et al. .......... F16B 5/08 |

(Continued)

FOREIGN PATENT DOCUMENTS

| CN | 102770227 A | 11/2012 |
| CN | 104245206 A | 12/2014 |

(Continued)

OTHER PUBLICATIONS

Machine Translation of WO 2016/129690 (Year: 2016).*

(Continued)

*Primary Examiner* — Humera N. Sheikh
*Assistant Examiner* — John D Schneible
(74) *Attorney, Agent, or Firm* — RatnerPrestia (57) ABSTRACT

A lap-fillet arc welding joint includes a weld bead, the weld bead being formed on an end portion of one sheet of overlapped two sheets and a surface of other sheet along the end portion. The other sheet includes a projecting portion projecting from the surface at a side of a weld toe of at least one of a start portion and a termination portion of the weld bead. The weld toe is located on a slope surface portion of the projecting portion at a side of the end portion of the one sheet.

3 Claims, 7 Drawing Sheets

(51) Int. Cl.
*B23K 9/02* (2006.01)
*B23K 31/00* (2006.01)
*B62D 21/02* (2006.01)
*B23K 9/025* (2006.01)
*B23K 101/00* (2006.01)
*B23K 101/18* (2006.01)
*B23K 101/28* (2006.01)
*B32B 15/01* (2006.01)
*B32B 15/04* (2006.01)
*B32B 23/04* (2006.01)

(52) U.S. Cl.
CPC ............ *B23K 33/008* (2013.01); *B62D 21/02* (2013.01); *B23K 2101/006* (2018.08); *B23K 2101/18* (2018.08); *B23K 2101/28* (2018.08); *B32B 15/00* (2013.01); *B32B 15/01* (2013.01); *B32B 15/04* (2013.01); *B32B 23/042* (2013.01); *Y10T 428/12* (2015.01); *Y10T 428/12493* (2015.01)

(56) References Cited

U.S. PATENT DOCUMENTS

| | | |
|---|---|---|
| 2013/0153092 A1 | 6/2013 | Kasuya et al. |
| 2015/0071703 A1 | 3/2015 | Ishida |
| 2015/0196967 A1 | 7/2015 | Tsuchiya |
| 2018/0029166 A1 | 2/2018 | Kodama et al. |

FOREIGN PATENT DOCUMENTS

| | | |
|---|---|---|
| CN | 104625359 A | 5/2015 |
| EP | 2639918 A1 | 2/2015 |
| JP | 05245630 A | 9/1993 |
| JP | 2006117125 A | 5/2006 |
| JP | 2008221300 A | 9/2008 |
| JP | 2010110793 A | 5/2010 |
| JP | 5022745 B2 | 9/2012 |
| JP | 5522317 B2 | 6/2014 |
| WO | 2014084317 A1 | 6/2014 |
| WO | 2016129690 A1 | 8/2016 |

OTHER PUBLICATIONS

Machine Translation of WO 2002/060614 (Year: 2002).*
International Search Report and Written Opinion for International Application No. PCT/JP2016/073230, dated Oct. 4, 2016, 6 pages.
Extended European Search Report for European Application No. 16 859 366.3, dated Dec. 6, 2018, 7 pages.
Chinese Office Action with Search Report for Chinese Application No. 2016-80061928.8, dated Dec. 26, 2019, with translation, 13 pages.

* cited by examiner

LAP-FILLET ARC WELDING JOINT AND JOINT STRUCTURE FOR PRESS FORMING PARTS

CROSS REFERENCE TO RELATED APPLICATIONS

This is the U.S. National Phase application of PCT/JP2016/073230, filed Aug. 8, 2016, which claims priority to Japanese Patent Application No. 2015-209711, filed Oct. 26, 2015 and Japanese Patent Application No. 2016-094433, filed May 10, 2016, the disclosures of these applications being incorporated herein by reference in their entireties for all purposes.

TECHNICAL FIELD OF THE INVENTION

The present invention relates to a lap-fillet arc welding joint of a thin-walled welded structural member such as automotive parts and a joint structure for press forming parts.

BACKGROUND OF THE INVENTION

In recent years, weight reduction of automotive bodies has been desired from the viewpoint of prevention of global warming in the automotive industry. For example, application of a high-strength steel sheet to chassis frame parts and suspension arm parts can contribute to weight reduction of automotive vehicles by using a thin-walled steel sheet. Most of the chassis frame parts and the suspension arm parts are joined by arc welding. When two parts are welded, lap-fillet arc welding has been widely used that welds an end portion of one part of the two parts and the surface of the other part together along the end portion of the one part.

When load is repeatedly applied to a structural member provided by assembling the two parts by the lap-fillet arc welding, fatigue cracks tend to be generated in a weld toe of a weld bead. In particular, the weld toe at a site where welding is started and/or terminated when forming the weld bead tends to increase in stress generated by the applied load and has the risk of generation of the fatigue cracks.

Patent Literature 1 discloses a technique of reducing stress concentration in a weld toe by forming, along the welding direction, a slope portion formed so as to be higher toward a root of weld on a member as a target of fillet arc welding and performing welding so as to cause the weld toe of a weld bead to be located at a halfway position of the slope portion.

Patent Literature 1: Japanese Laid-open Patent Publication No. 2008-221300

SUMMARY OF THE PRESENT INVENTION

In the technique disclosed in Patent Literature 1, the slope portion is formed so as to be higher toward the root of weld. A weld metal forming the weld toe is largely influenced by surface tension with melting of the weld metal and the weld toe thus tends to have a shape projecting to the slope portion rather than a shape along the slope portion. For this reason, the technique cannot necessarily reduce generation of fatigue cracks sufficiently. Furthermore, the technique disclosed in Patent Literature 1 is a fillet arc welding method for a steady portion on which welding is uniformly performed because it is targeted on fillet arc welding on a cylindrical axle housing portion in the peripheral direction. Accordingly, when the technique disclosed in Patent Literature 1 is applied to the present application, weld toes are located, in a start portion and a termination portion of a weld bead, in regions other than the slope portion of the steady portion that is formed on a member as a target of the fillet arc welding and on which the welding is uniformly performed because flat sheets are overlapped on each other and the fillet arc welding is performed along an end portion of one flat sheet in the present application. The technique disclosed in Patent Literature 1 thus does not function as an effective method for a welding joint in which stress concentration is generated at the highest level in the start portion and the termination portion of the weld bead and a joint structural member provided by joining parts by the welding joint.

Aspects of the present invention has been made in view of the above-mentioned problems and an object thereof is to provide a lap-fillet arc welding joint and a joint structure for press forming parts that are provided by performing lap-fillet arc welding on two sheets using arc welding and are excellent in fatigue strength without increasing welding cost and the number of processes.

A lap-fillet arc welding joint according to aspects of the present invention includes a weld bead, the weld bead being formed on an end portion of one sheet of overlapped two sheets and a surface of other sheet along the end portion, wherein the other sheet includes a projecting portion projecting from the surface at a side of a weld toe of at least one of a start portion and a termination portion of the weld bead, and the weld toe is located on a slope surface portion of the projecting portion at a side of the end portion of the one sheet.

In the lap-fillet arc welding joint according to an aspect of the present invention, the one sheet includes a projection projecting in a same direction as a projecting direction of the projecting portion, and the projection has a shape covering at least a part of the projecting portion.

In the lap-fillet arc welding joint according to an aspect of the present invention, the projecting portion includes a projection extending along the weld bead and projecting from the surface, and a weld toe of a steady portion of the weld bead is located on a slope surface portion of the projection at the side of the end portion of the one sheet.

A joint structure for press forming parts according to an aspect of the present invention is configured by fitting two press forming parts, each including an opening in at least one side of a cross section, into each other in a state in which the opening of one press forming part and the opening of other press forming part oppose each other, and includes a weld bead on a front end portion of a longitudinal wall portion of the one press forming part and a surface of a longitudinal wall portion of the other press forming part along the front end portion, wherein the longitudinal wall portion of the other press forming part includes a projecting portion projecting from the surface at a side of a weld toe of at least one of a start portion and a termination portion of the weld bead, and the weld toe is located on a slope surface portion of the projecting portion at an opposing weld toe side and at the one press forming part side.

With the lap-fillet arc welding joint and the joint structure for press forming parts according to an aspect of the present invention, a weld bead is formed on an end portion of one sheet of overlapped two sheets and a surface of the other sheet along the end portion, the other sheet has a projecting portion projecting from the surface at a side of a weld toe of at least one of a start portion and a termination portion of the weld bead, and the weld toe is located on a slope surface portion of the projecting portion at the side of the end portion of the one sheet. With this configuration, stress concentration is moderated when load repeatedly acts on the weld toe, and fatigue strength is improved without increasing welding cost and the number of processes.

BRIEF DESCRIPTION OF THE DRAWINGS

FIG. 10(a)-(d) is a descriptive view for explaining shapes of test bodies used for a basic fatigue test in an example.

DETAILED DESCRIPTION OF EMBODIMENT OF THE INVENTION

Hereinafter, a lap-fillet arc welding joint and a joint structure for press forming parts according to an embodiment of the present invention will be described with reference to the drawings.

Figure 1:
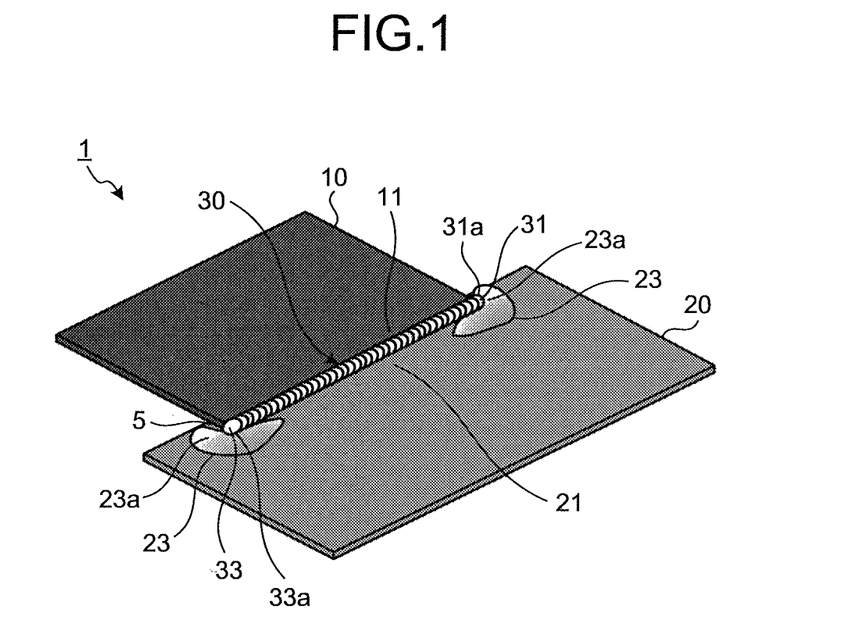
FIG. 1 is a perspective view of a lap-fillet arc welding joint according to an embodiment of the present invention.

FIG. 1 is a perspective view of the lap-fillet arc welding joint in the embodiment of the present invention. As illustrated in FIG. 1, a lap-fillet arc welding joint 1 in the embodiment of the present invention is provided by overlapping one sheet (upper sheet 10) and the other sheet (lower sheet 20) with an overlap margin portion 5 and joining them using arc welding so as to form a weld bead 30 on an end portion 11 of the upper sheet 10 and a surface 21 of the lower sheet 20 along the end portion 11.

Figure 2:
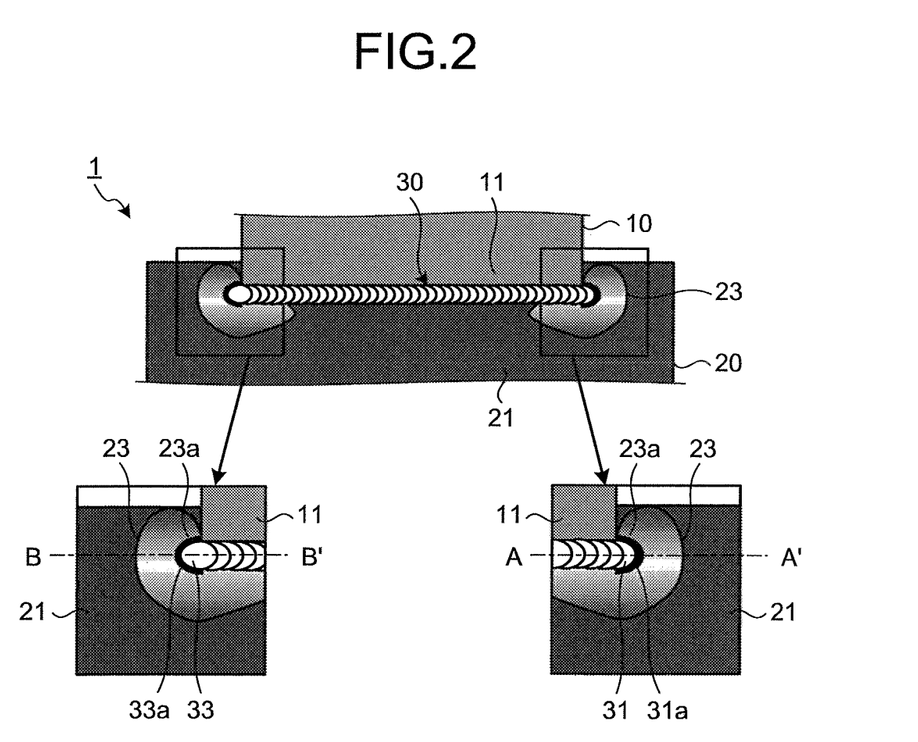
FIG. 2 is a top view of the lap-fillet arc welding joint in the embodiment of the present invention.

FIG. 2 is a top view of the lap-fillet arc welding joint 1. The weld bead 30 is formed by advancement of welding to the left side from the right side in FIG. 2 and a weld toe 31a is formed in a start portion 31 of the weld bead 30 and a weld toe 33a is formed in a termination portion 33 thereof.

The lower sheet 20 that is used for the lap-fillet arc welding joint 1 has projecting portions 23 at respective sides of the weld toe 31a of the start portion 31 and the weld toe 33a of the termination portion 33 of the weld bead 30. The projecting portions 23 are formed so as to project from the side of the surface 21 of the lower sheet 20 and include slope surface portions 23a inclined with respect to the surface 21.

Figure 3:
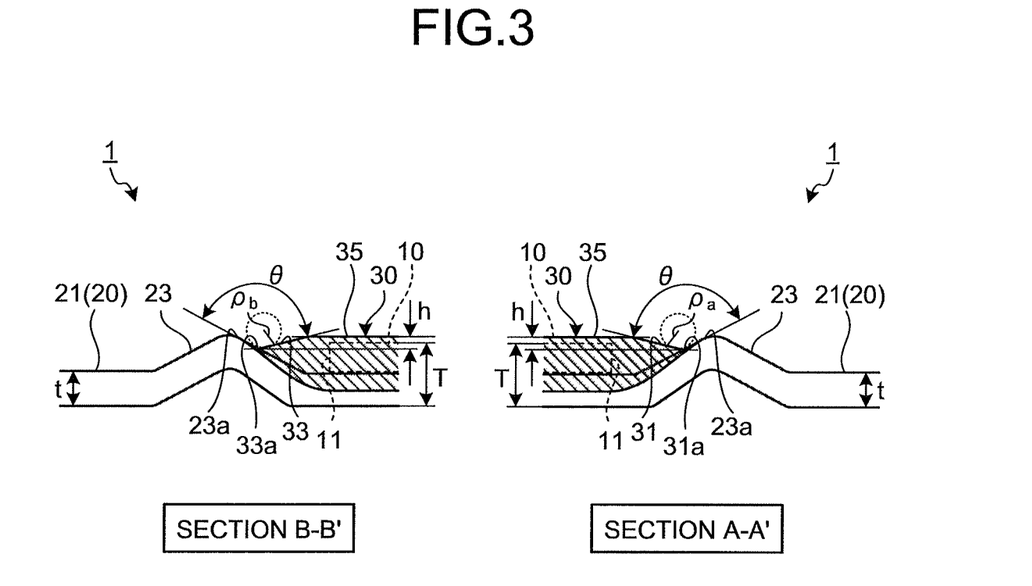
FIG. 3 is a sectional view for explaining the lap-fillet arc welding joint in the present invention.

FIG. 3 illustrates shapes of a section A-A' of the weld toe 31a and a section B-B' of the weld toe 33a illustrated in FIG. 2. As illustrated in FIG. 3, the weld toe 31a and the weld toe 33a are located at the upper sheet 10 side on the slope surface portions 23a of the projecting portions 23 provided at the respective sides.

A reason why fatigue strength of the lap-fillet arc welding joint 1 is improved by causing the weld toe 31a of the start portion 31 or the weld toe 33a of the termination portion 33 of the weld bead 30 to be located at the upper sheet 10 side on the slope surface portion 23a of the projecting portion 23 provided on the lower sheet 20 at the surface 21 side will be described with reference to FIG. 3 and FIG. 4.

Figure 4:
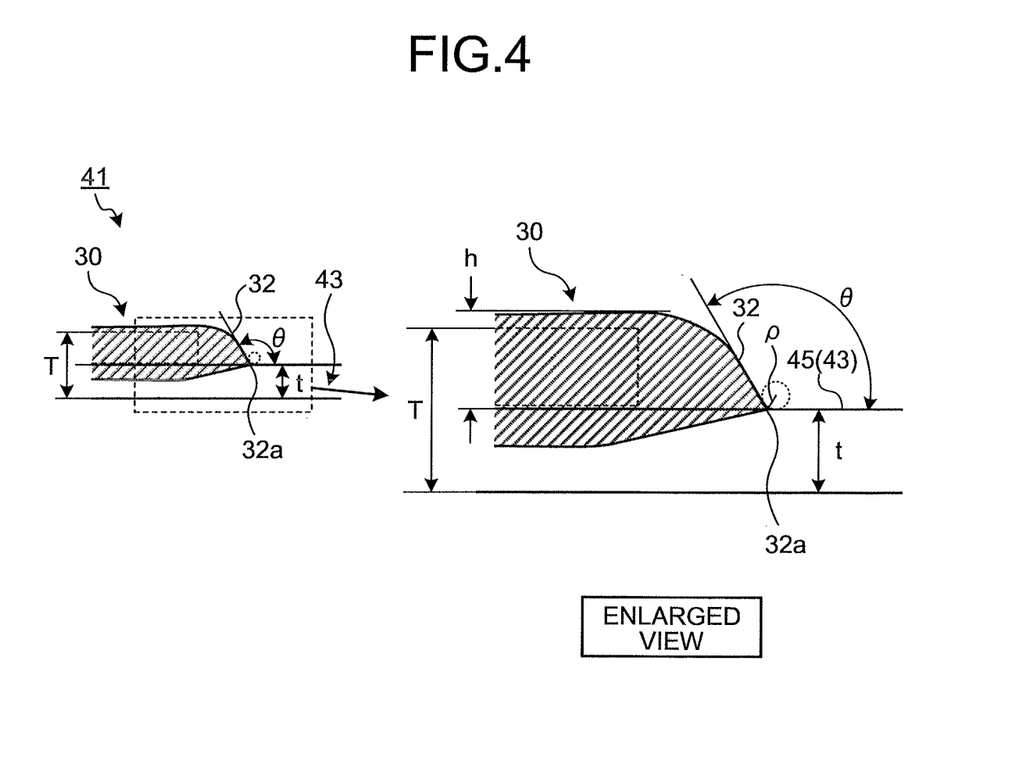
FIG. 4 is a sectional view for explaining a conventional lap-fillet arc welding joint.

In the case of a conventional lap-fillet arc welding joint 41 configured by overlapping one sheet and the other sheet and forming the weld bead 30 along an end portion of the one sheet as illustrated in FIG. 4, a start portion 32 of the weld bead 30 has a shape swelling on a surface 45 of a lower sheet 43 and a weld toe 32a having a curvature radius ρ is formed on the surface 45.

On the other hand, in the case of the lap-fillet arc welding joint 1 in an embodiment of the present invention, as illustrated in FIG. 3, the weld toe 31a having a curvature radius $\rho_a$ is formed in the start portion 31 and the weld toe 33a having a curvature radius $\rho_b$ is formed in the termination portion 33.

It is generally known that a stress concentration factor $K_t$ in the weld toe of the weld bead is calculated by the following equation (1).

$$K_t = 1 + \left[\frac{1 - \exp\left\{-0.9\sqrt{\frac{T}{h}} \cdot (\pi - \theta)\right\}}{1 - \exp\left\{-0.9\sqrt{\frac{T}{h}} \cdot \left(\frac{\pi}{2}\right)\right\}}\right] \cdot \left[\tanh\left\{\frac{\left(\frac{T}{t} - 1\right)^{\frac{1}{4}}}{1 - \frac{\rho}{2t}}\right\}\right] \cdot \left[\frac{0.13 + 0.65\left(1 - \frac{\rho}{2t}\right)^4}{\left(\frac{\rho}{2t}\right)^{\frac{1}{3}}}\right] \quad (1)$$

In the equation (1), θ is a flank angle, ρ is the curvature radius, T is an overlap margin thickness, t is a lower sheet thickness, and h is a weld bead height (difference between a top portion 35 and the weld toe 31a or the weld toe 33a of the weld bead 30 in the sheet thickness direction in FIG. 3).

The equation 1 indicates that as the flank angle θ and the curvature radius ρ are larger, the stress concentration factor $K_t$ is lower and the stress concentration in the weld toe is moderated.

In the lap-fillet arc welding joint in an embodiment of the present invention, the weld toe 31a and the weld toe 33a of the weld bead 30 are located on the slope surface portions 23a of the projecting portions 23 at the upper sheet 10 side, unlike the conventional lap-fillet arc welding joint 41. With this configuration, the weld bead height h is small (see FIG. 3 and FIG. 4) and swelling of the weld metal on the weld toe 31a and the weld toe 33a is decreased. As a result, the flank angles θ on the weld toe 31a and the weld toe 33a are increased. Furthermore, in the case of the lap-fillet arc welding joint 1 in an embodiment of the present invention, the projecting portions 23 are also formed on the end portions of the upper sheet 10 in the width direction and the stress concentration in the weld toes is further moderated unlike the conventional lap-fillet arc welding joint 41. Accordingly, the lap-fillet arc welding joint 1 in and embodiment of the present invention has a lower stress concentration factor than the conventional lap-fillet arc welding joint 41 does and improves the fatigue strength.

In the lap-fillet arc welding joint 1, the width of the end portion 11 of the upper sheet 10 is smaller than that of the lower sheet 20 (FIG. 1). By contrast, in a lap-fillet arc welding joint 51 configured by joining the lower sheet 20 and an upper sheet 60 having substantially the same sheet width as that of the lower sheet 20, projections 63 projecting in the same direction as the projecting direction of the projecting portions 23 are provided on the upper sheet 60 such that the projecting portions 23 formed on the lower sheet 20 so as to come around the start portion 31 and the termination portion 33 of the weld bead 30 in the lengthwise direction (welding direction) do not interfere with the upper sheet 60 when the upper sheet 60 and the lower sheet 20 are overlapped with each other. It is sufficient that the projections 63 have shapes covering at least parts of the projecting portions 23.

Figure 7:
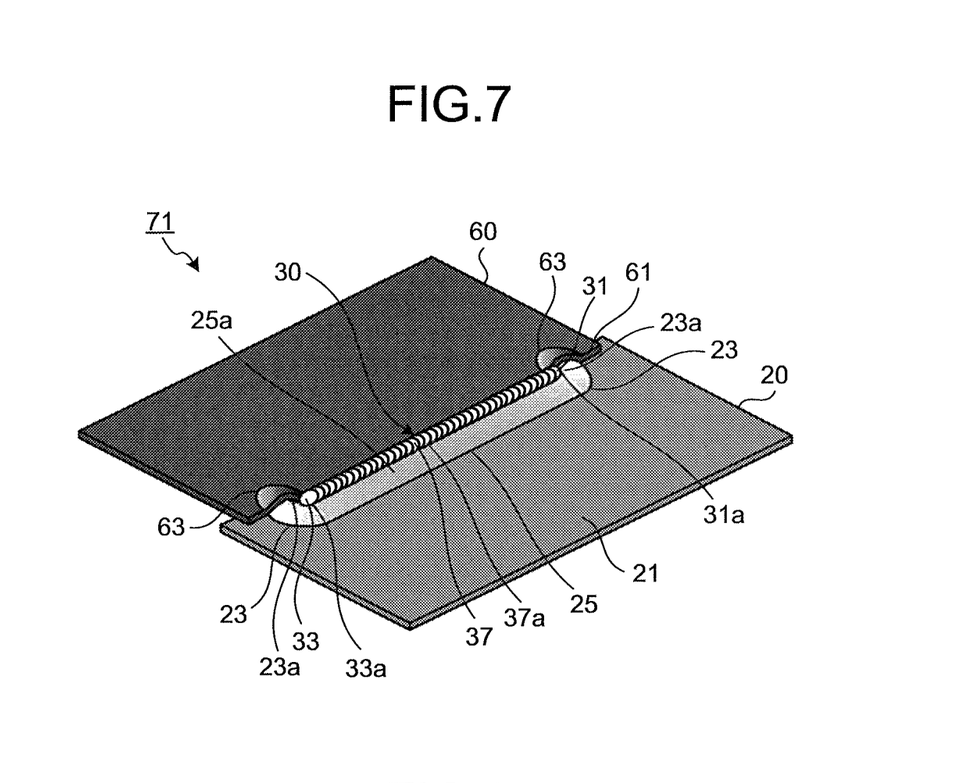
FIG. 7 is a perspective view of still another mode of the lap-fillet arc welding joint in the embodiment of the present invention.
Figure 8:
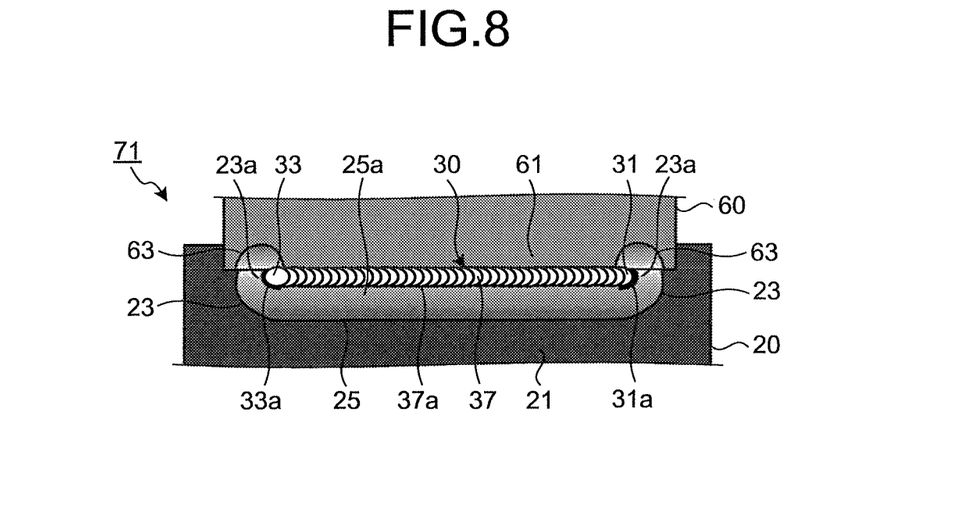
FIG. 8 is a top view of still another mode of the lap-fillet arc welding joint in the embodiment of the present invention.

As in a lap-fillet arc welding joint 71 illustrated in FIG. 7 and FIG. 8, the projecting portions 23 have a projection 25 extending along the lengthwise direction of the weld bead 30 and the weld bead 30 is formed so as to cause a weld toe 37a of a steady portion 37 of the weld bead 30 to be located on a slope surface portion 25a of the projection 25 at the center side of the upper sheet 60, thereby further improving the fatigue strength.

Furthermore, in the above description, the projecting portions 23 are formed on the lower sheet 20 at the surface 21 side at the sides of the weld toe 31a and the weld toe 33a of both of the start portion 31 and the termination portion 33 of the weld bead 30. Alternatively, the projecting portion 23 may be formed on the lower sheet 20 at the surface 21 side at the side of the weld toe 31a or the weld toe 33a of any one of the start portion 31 and the termination portion 33 of the weld bead 30, and the weld toe 31a or the weld toe 33a may be located on the slope surface portion 23a of the projecting portion 23 at the center side of the upper sheet 60.

In the above description, one weld bead is formed at a site at which the two sheets are joined. Alternatively, the lap-fillet arc welding joint in the embodiment may be configured by forming a stitch-like weld bead (weld bead provided by intermittently forming continuous weld beads each having a predetermined length with predetermined intervals therebetween) along the end portion of one sheet, providing a projecting portion projecting from the surface of the other sheet at the side of at least one of sites at which formation of the stitch-like weld bead is started and terminated, and causing a weld toe of the site at which the formation of the stitch-like weld bead is started or terminated to be located on a slope surface portion of the projecting portion.

The lap-fillet arc welding joint in an embodiment of the present invention has the above-mentioned configuration, so that the stress concentration in the weld toe or toes of the start portion and/or the termination portion of the weld bead joining the two sheets is moderated and the fatigue strength is improved. Furthermore, the projecting portions and the projections in the lap-fillet arc welding joint in an embodiment of the present invention can be easily formed by press forming or the like, thereby providing the lap-fillet arc welding joint that is excellent in the fatigue strength without increasing the welding cost and the number of processes.

It should be noted that the present invention is not limited to the above-mentioned embodiment and can be executed as a joint structure for press forming parts, which will be described below.

Figure 9:
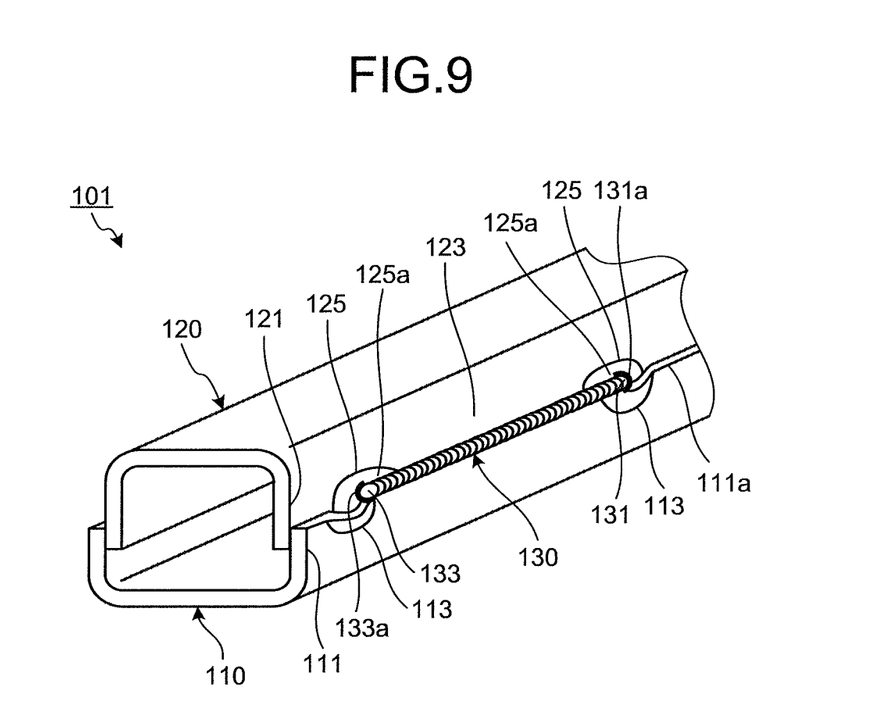
FIG. 9 is a perspective view of a joint structure for press forming parts in the embodiment of the present invention.

A joint structure 101 for press forming parts as an example illustrated in FIG. 9 is configured by fitting two parts of a press forming part 110 and a press forming part 120 having openings in at least one sides of sections into each other in a state in which the openings of the press forming part 110 and the openings of the press forming part 120 oppose each other, and has a weld bead 130 on a front end portion 111a of a longitudinal wall portion 111 of the press forming part 110 and a surface 123 of a longitudinal wall portion 121 of the press forming part 120 along the front end portion 11a. The longitudinal wall portion 121 of the press forming part 120 has projecting portions 125 projecting from the surface 123 at the sides of a weld toe 131a of a start portion 131 and a weld toe 133a of a termination portion 133 of the weld bead 130. The weld toe 131a and the weld toe 133a are located on slope surface portions 125a of the projecting portions 125 at the side of the opposing weld toes and at the press forming part 110 side. The press forming part 110 has projections 113 projecting in the same direction as the projection direction of the projecting portions 125.

The joint structure of the press forming parts in an embodiment of the present invention may have the projecting portions 125 at the sides of the weld toe 131a and the weld toe 133a of both of the start portion 131 and the termination portion 133 of the weld bead 130 on the longitudinal wall portion 121 of the press forming part 120, as described above. Alternatively, the joint structure of the press forming parts in an embodiment of the present invention may have the projecting portion 125 at the side of the weld toe 131a or the weld toe 133a of any one of the start portion 131 and the termination portion 133 of the weld bead 130.

As described above, the joint structure of the press forming parts in aspects of the present invention has the above-mentioned configuration, so that stress concentration in the weld toe of the start portion and/or the termination portion of the weld bead joining the two press forming parts is moderated and the fatigue strength is improved, as in the lap-fillet arc welding joint in the above-mentioned embodiment.

Furthermore, the projecting portions and the projections in the joint structure of the press forming parts in an embodiment of the present invention can be formed simultaneously with the formation of the press forming parts, thereby providing the joint structure of the press forming parts that is excellent in the fatigue strength without increasing the welding cost and the number of processes.

Example of the Invention

An experiment for checking action effects of aspects of the present invention was executed. The following describes this experiment.

In the example, a basic fatigue test using test bodies configured by two steel sheets joined by the lap-fillet arc welding joint according to aspects of the present invention or the conventional lap-fillet arc welding joint (see FIG. 4) was performed and the fatigue strengths were evaluated.

Each of the test bodies used in the basic fatigue test was prepared with the following procedures using a hot-rolled sheet having a sheet thickness t of 2.6 mm in a class of 780 MPa as a sample material. First, two pieces of steel sheet having predetermined dimensions were cut out from the sample material. When a weld bead was formed on an end portion of one piece of steel sheet of the cut-out two pieces of steel sheet at the side of the long side and the surface of the other piece of steel sheet along the end portion to join the two pieces of steel sheet, a projecting portion projecting from the surface was formed at the side of the weld toe of at least one of a start portion and a termination portion of the weld bead on the other piece of steel sheet.

Then, the one piece of steel sheet in the cut-out state and the other piece of steel sheet on which the projecting portion was formed were overlapped with each other and the weld bead was formed by arc welding along the end portion of the one piece of steel sheet. With this manner, the test body having the lap-fillet arc welding joint according to embodiments of the present invention was prepared.

Figure 10:
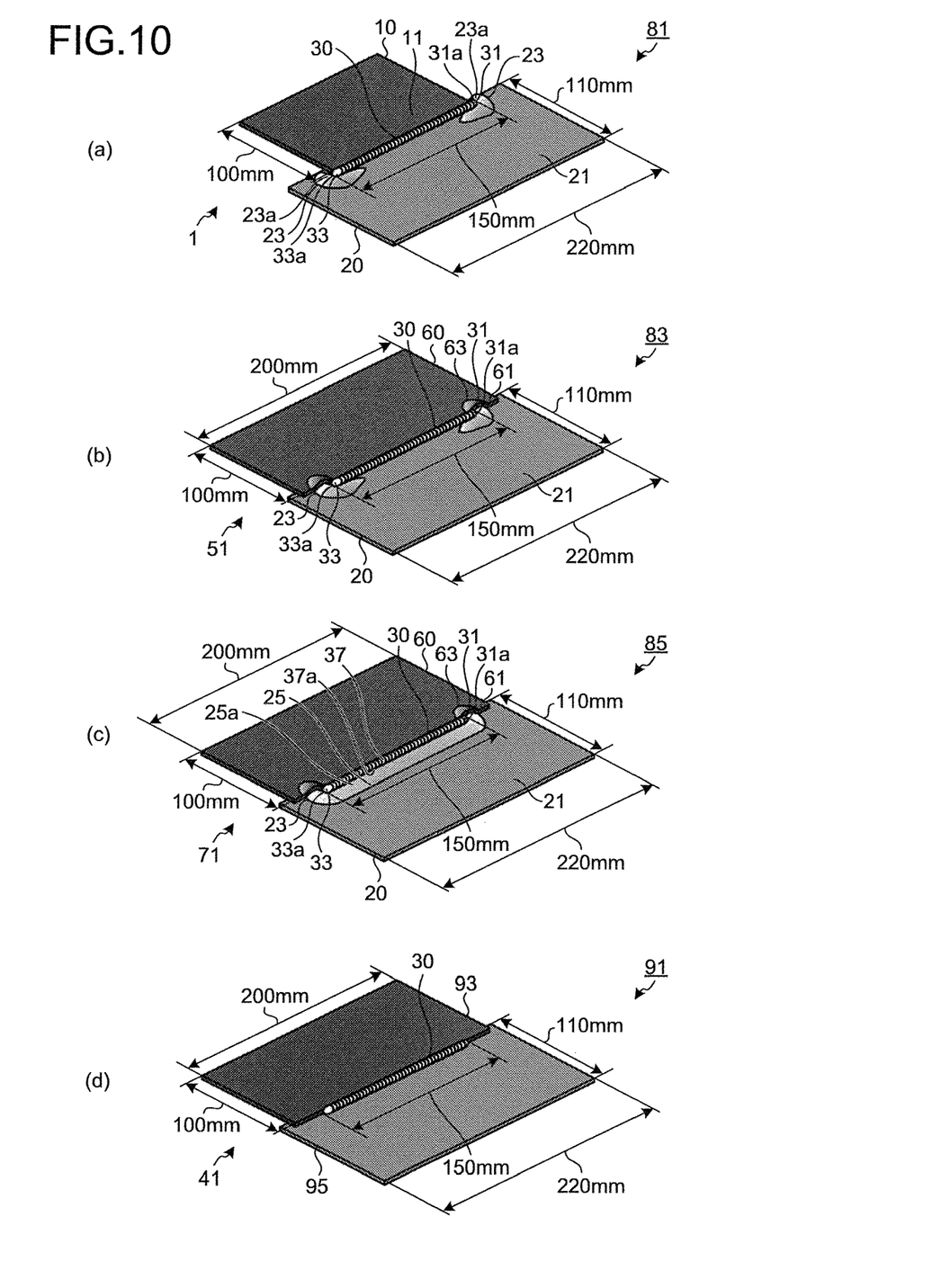

FIG. 10 illustrates shapes of the prepared test bodies. A part (a) of FIG. 10 illustrates a test body 81 having the lap-fillet arc welding joint 1 in accordance with an embodiment of the present invention (inventive example 1), in which the weld bead 30 is formed on the end portion 11 of the one piece of steel sheet (upper sheet 10) and the surface 21 of the other piece of steel sheet (lower sheet 20) along the end portion 11, as illustrated in FIG. 1 and FIG. 2. The projecting portions 23 projecting from the surface 21 of the lower sheet 20 are provided at the respective sides of the weld toe 31a of the start portion 31 and the weld toe 33a of the termination portion 33 of the weld bead 30. The weld toe 31a and the weld toe 33a are located on the slope surface portions 23a of the projecting portions 23 at the upper sheet 10 side.

Figure 5:
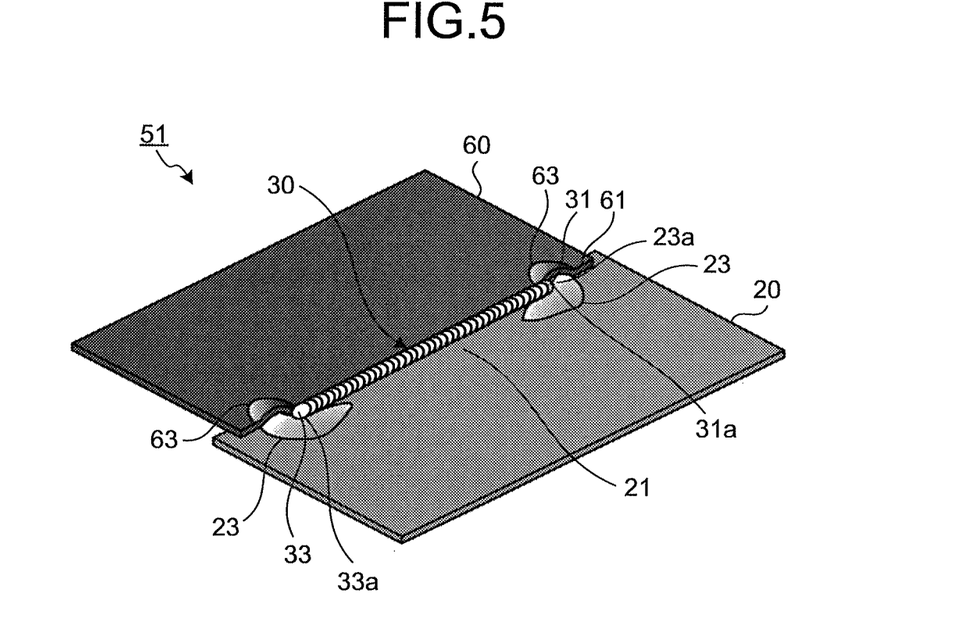
FIG. 5 is a perspective view of another mode of the lap-fillet arc welding joint in the embodiment of the present invention.
Figure 6:
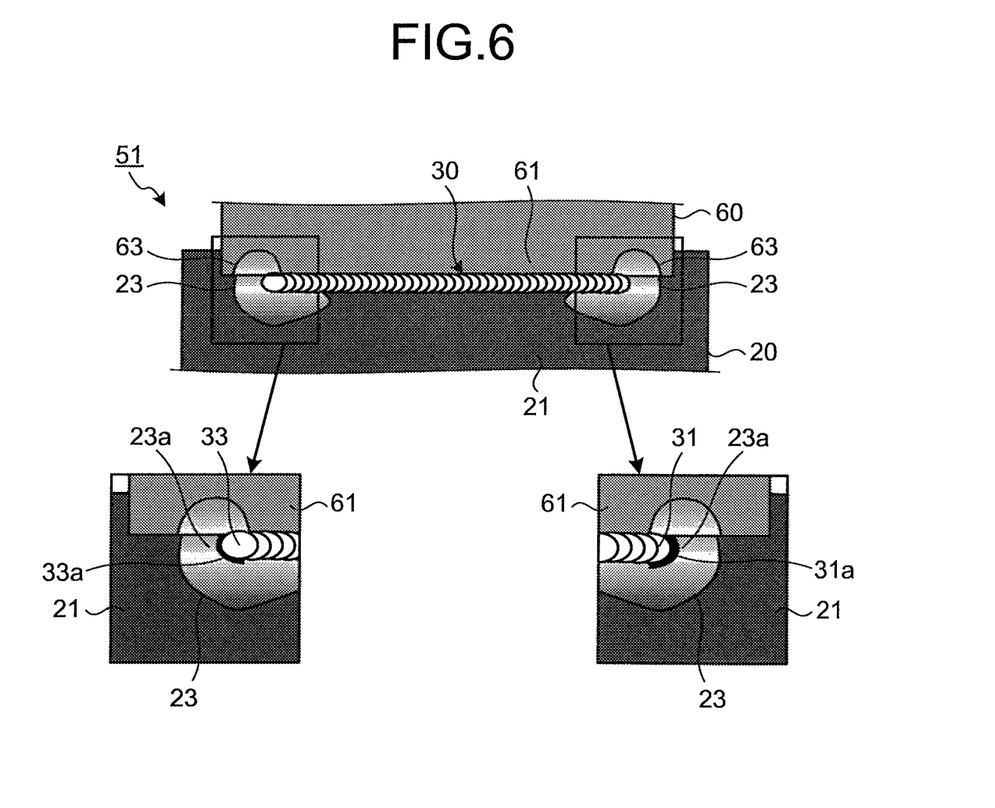
FIG. 6 is a top view of another mode of the lap-fillet arc welding joint in the embodiment of the present invention.

A part (b) of FIG. 10 illustrates a test body 83 having the lap-fillet arc welding joint 51 in accordance with an embodiment the present invention (inventive example 2), in which the projecting portions 23 projecting from the surface 21 of the lower sheet 20 are provided at the respective sides of the weld toe 31a and the weld toe 33a of the start portion 31 and the termination portion 33 of the weld bead 30 formed on an end portion 61 of the piece of steel sheet (upper sheet 60) having substantially the same sheet thickness as that of the lower sheet 20 and the surface 21 of the lower sheet 20 along the end portion 61, as illustrated in FIG. 5 and FIG. 6. Furthermore, in order to prevent the upper sheet 60 from interfering with the projecting portions 23 when the upper sheet 60 and the lower sheet 20 are overlapped with each other, the projections 63 are formed on the upper sheet 60.

A part (c) of FIG. 10 illustrates a test body 85 having the lap-fillet arc welding joint 71 in accordance with aspects of the present invention (inventive example 3), in which the projecting portions 23 projecting from the surface 21 of the lower sheet 20 are provided at the respective sides of the weld toe 31a and the weld toe 33a of the start portion 31 and the termination portion 33 of the weld bead 30 formed on the end portion 61 of the upper sheet 60 on which the projections 63 are provided and the surface 21 of the lower sheet 20 along the end portion 61, as illustrated in FIG. 7 and FIG. 8. Furthermore, the projecting portions 23 have the projection 25 extending along the lengthwise direction of the upper sheet 60 and the weld bead 30 is formed so as to cause the weld toe 37a of the steady portion 37 of the weld bead 30 to be located on the slope surface portion 25a of the projection 25 at the center side of the upper sheet 60.

A part (d) of FIG. 10 illustrates a test body 91 having the conventional lap-fillet arc welding joint 41 (see FIG. 4) (comparative example), in which the weld bead 30 is formed on an end portion of a piece of steel sheet (upper sheet 93) and the surface of a piece of steel sheet (lower sheet 95) along the end portion to join the pieces of steel sheets.

In the example, arc welding conditions were set to a welding current of 180 A, a voltage of 22.5 V, a torch speed of 80 cm/min, and shield gas of Ar-20% $CO_2$, and a high-strength steel having a diameter of 1.2 mm in a class of 780 MPa was used as a weld wire.

The basic fatigue test was performed by pulsating plane bending. In this case, each of the upper sheets 10, 60, and 93 was fixed to the side of a drive arm of a test machine whereas each of the lower sheets 20 and 95 was fixed to the side of a measurement swing arm of the test machine, and the test body was installed such that the center of the sheet thickness of the lower sheet 20 was a bending neutral surface. Then, load was repeatedly applied such that a target stress was applied to each test body through the drive arm and the fatigue test was performed until a crack was generated in the test body.

The stress that was applied to the test body was calculated from a bending moment (see FIG. 11) measured through the measurement swing arm and the sheet thickness and the sheet width of the test body (each average sheet width of the upper sheet 10 and the lower sheet 20, the upper sheet 60 and the lower sheet 20, and the upper sheet 93 and the lower sheet 95). The fatigue test conditions were set to a stress ratio of 0 (pulsating) and a test frequency of 20 Hz, and the maximum number of repeat times in the fatigue test was set to ten million times.

Figure 11:
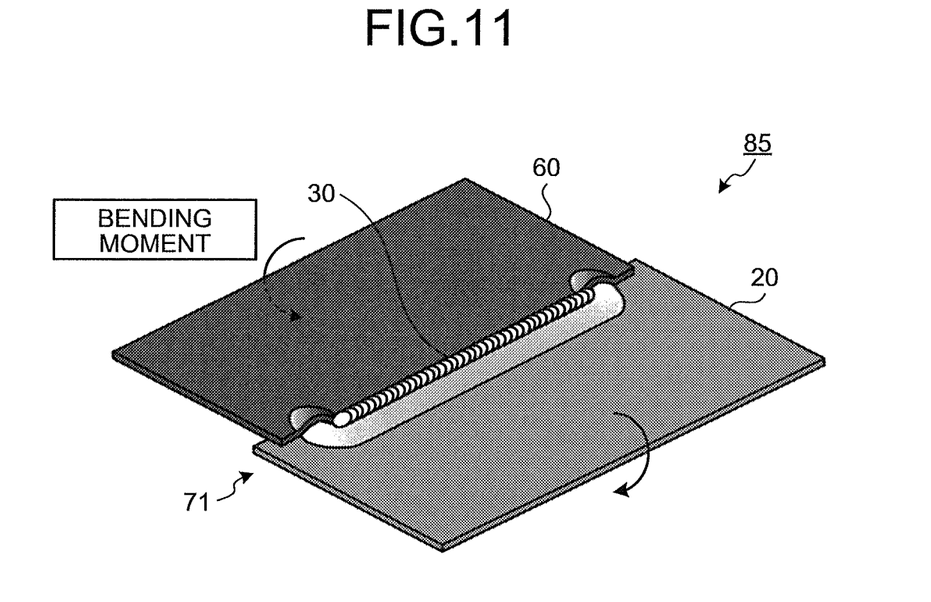
FIG. 11 is a descriptive view for explaining the basic fatigue test in the example.

FIG. 11 is a descriptive view for explaining the fatigue test targeted on the test body 85 using the upper sheet 60 and the fatigue test targeted on the respective test bodies in the inventive examples 1 and 2 and the comparative example is also the same as that in FIG. 11.

Figure 12:
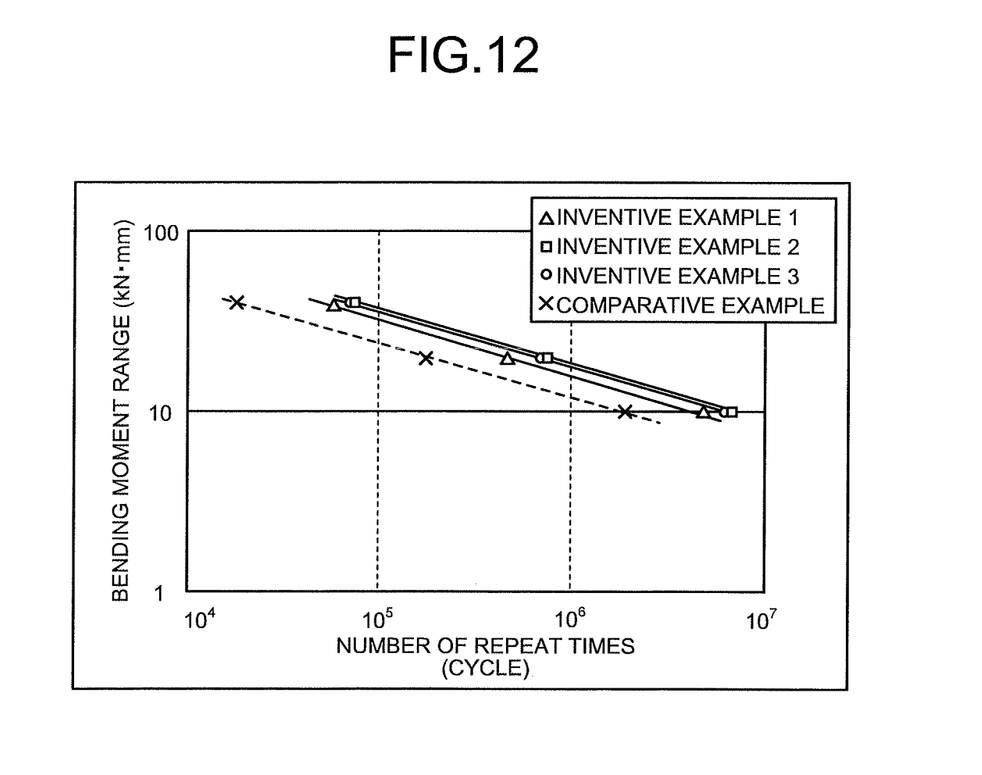
FIG. 12 is a view illustrating a basic fatigue test result in the example.

FIG. 12 illustrates a fatigue test result. In all of the inventive examples 1 to 3, the fatigue lifetime was longer than that in the comparative example, as a result.

The above-mentioned experiment proved the following. That is, when an end portion of one sheet of two sheets as targets of the lap-fillet arc welding and the surface of the other sheet are joined by the arc welding along the end portion of the one sheet, the projecting portions projecting from the surface of the other sheet are provided at the sides of the weld toes of the start portion and the termination portion of the weld bead and the arc welding is performed such that the weld toes are located on the slope surface portions of the projecting portions at the center side of the upper sheet, thereby increasing the fatigue lifetime of the lap-fillet arc welding joint, that is, improving the fatigue strength.

INDUSTRIAL APPLICABILITY

Aspects of the present invention can provide a lap-fillet arc welding joint and a joint structure for press forming parts that are provided by performing lap-fillet arc welding on two sheets using arc welding and are excellent in fatigue strength without increasing welding cost and the number of processes.

REFERENCE SIGNS LIST

1 LAP-FILLET ARC WELDING JOINT
5 OVERLAP MARGIN PORTION
10 UPPER SHEET
11 END PORTION
20 LOWER SHEET
21 SURFACE
23 PROJECTING PORTION
23a SLOPE SURFACE PORTION
25 PROJECTION
25a SLOPE SURFACE PORTION
30 WELD BEAD
31 START PORTION
31a WELD TOE

32 START PORTION
32a WELD TOE
33 TERMINATION PORTION
33a WELD TOE
35 TOP PORTION
37 STEADY PORTION
37a WELD TOE
41 LAP-FILLET ARC WELDING JOINT (CONVENTIONAL TECHNIQUE)
43 LOWER SHEET
45 SURFACE
51 LAP-FILLET ARC WELDING JOINT (AN EMBODIMENT OF PRESENT INVENTION)
60 UPPER SHEET
61 END PORTION
63 PROJECTION
71 LAP-FILLET ARC WELDING JOINT (AN EMBODIMENT OF PRESENT INVENTION)
81 TEST BODY (INVENTIVE EXAMPLE 1)
83 TEST BODY (INVENTIVE EXAMPLE 2)
85 TEST BODY (INVENTIVE EXAMPLE 3)
91 TEST BODY (COMPARATIVE EXAMPLE)
93 UPPER SHEET
95 LOWER SHEET
101 JOINT STRUCTURE FOR PRESS FORMING PARTS
110 PRESS FORMING PART
111 LONGITUDINAL WALL PORTION
111a FRONT END PORTION
113 PROJECTION
120 PRESS FORMING PART
121 LONGITUDINAL WALL PORTION
123 SURFACE
125 PROJECTING PORTION
130 WELD BEAD
131 START PORTION
131a WELD TOE
133 TERMINATION PORTION
133a WELD TOE

The invention claimed is:

1. A lap-fillet arc welding joint comprising a weld bead, the weld bead being formed on an end portion of one sheet of overlapped two sheets and a surface of other sheet along the end portion of the one sheet, wherein
the other sheet includes a projecting portion projecting from the surface at a side of a weld toe of at least one of a start portion and a termination portion of the weld bead, and
the weld toe is located on a slope surface portion of the projecting portion at a side of the end portion of the one sheet,
wherein the one sheet includes a projection projecting in a same direction as a projecting direction of the projecting portion, and
the projection has a shape covering at least a part of the projecting portion.

2. The lap-fillet arc welding joint according to claim 1, wherein
the projecting portion includes a further projection extending along the weld bead and projecting from the surface of the other sheet, and
a weld toe of a steady portion of the weld bead is located on a slope surface portion of the further projection at the side of the end portion of the one sheet.

3. A joint structure for press forming parts that is configured by fitting two press forming parts, each including an opening in at least one side of a cross section, into each other in a state in which the opening of one press forming part and the opening of other press forming part oppose each other, and includes a weld bead on a front end portion of a longitudinal wall portion of the one press forming part and a surface of a longitudinal wall portion of the other press forming part along the front end portion of the longitudinal wall portion of the one press forming part, wherein
the longitudinal wall portion of the other press forming part includes a projecting portion projecting from the surface at a side of a weld toe of at least one of a start portion and a termination portion of the weld bead, and
the weld toe is located on a slope surface portion of the projecting portion at an opposing weld toe side and at the one press forming part side,
wherein the one press forming part includes a projection projecting in a same direction as a projecting direction of the projecting portion, and
the projection has a shape covering at least a part of the projecting portion.

* * * * *